United States Patent [19]
Kendall, Jr.

[11] 3,818,821
[45] June 25, 1974

[54] APPARATUS FOR PEELING FRUIT AND VEGETABLES

[76] Inventor: Harold E. Kendall, Jr., 1680 S. Bayshore Ln., Coconut Grove, Fla. 33133

[22] Filed: Jan. 2, 1973

[21] Appl. No.: 320,812

[52] U.S. Cl............................ 99/540, 4/565, 4/566, 4/567, 4/584, 4/585
[51] Int. Cl............................................. A23n 7/00
[58] Field of Search............ 99/538, 537, 540, 565, 99/566, 567, 575, 584, 585, 548, 590

[56] References Cited
UNITED STATES PATENTS

| | | | |
|---|---|---|---|
| 2,500,981 | 3/1950 | Eymenic | 99/565 |
| 2,659,298 | 11/1953 | Hudson | 99/495 X |
| 3,351,000 | 11/1967 | Alexander | 99/584 X |
| 3,480,057 | 11/1969 | Wilhelm | 99/584 X |

FOREIGN PATENTS OR APPLICATIONS

| 203,610 | 10/1956 | Australia | 99/495 |
|---|---|---|---|

Primary Examiner—Henry K. Artis
Attorney, Agent, or Firm—John Cyril Malloy

[57] ABSTRACT

An apparatus for removing the peels from the meats of segmented fruits and vegetables by directing the segments between a moving belt and a rotating perforated drum, the moving belt being directed around two drums provided with individual pressurizing means for automatically controlling the amount of meat removed from the peel in direct proportion to the consistency of the meat as determined primarily by the ripeness of the fruit or vegetable. After the desired amount of meat is removed from the peels, said meat is discharged in pulp form into an appropriate receptacle and the peels are discharged from between the belt and the perforated drum.

11 Claims, 4 Drawing Figures

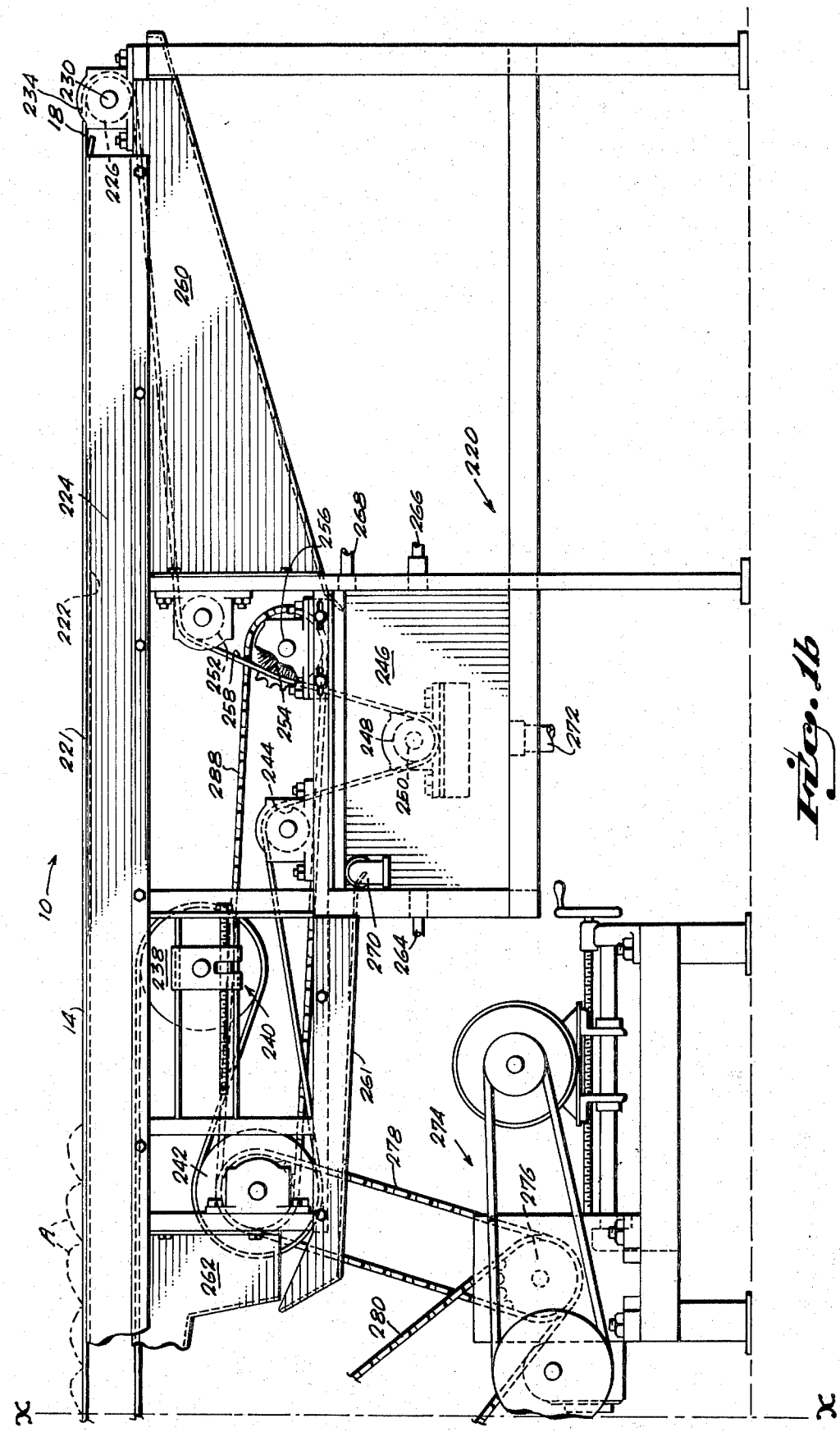

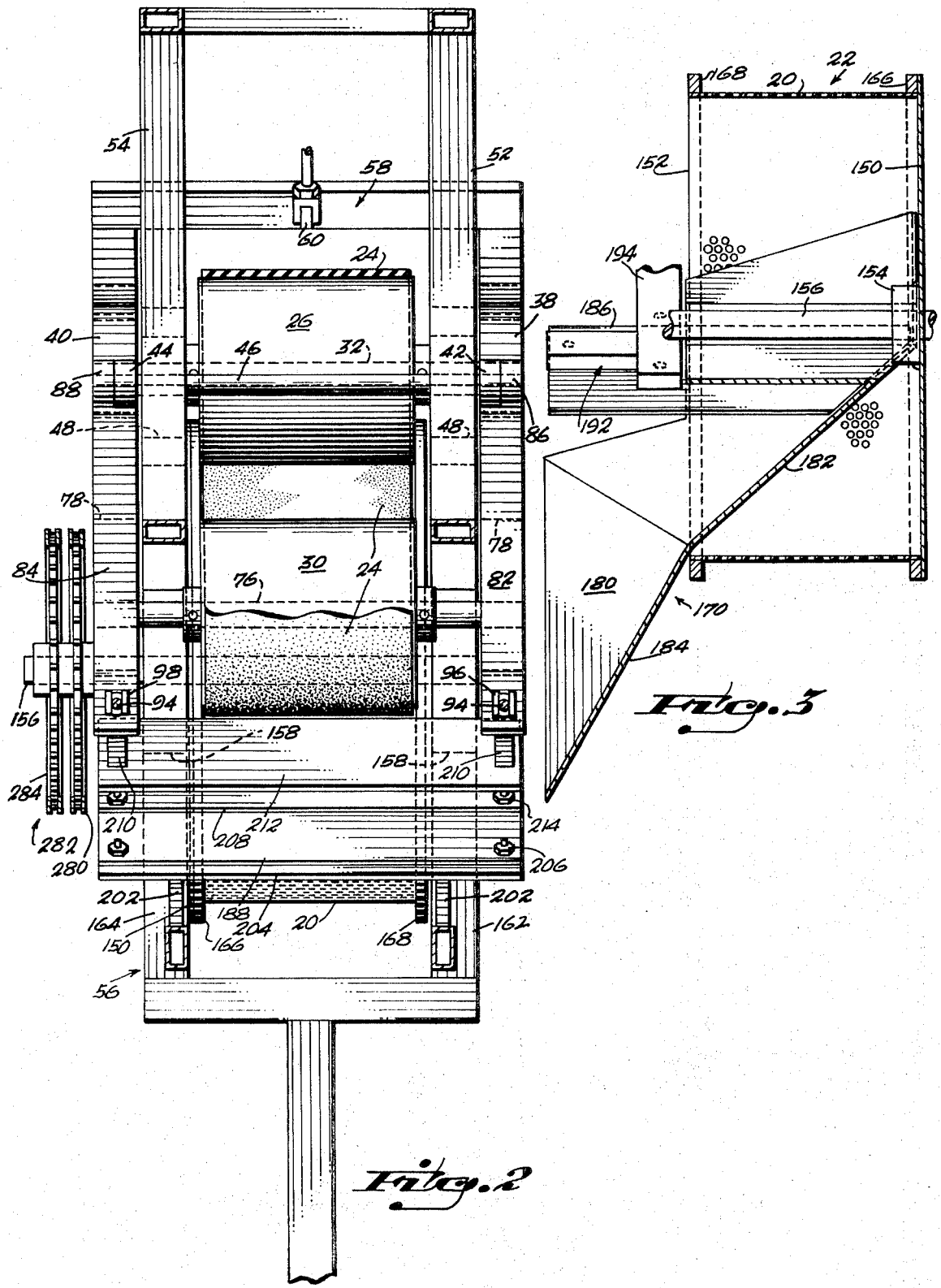

3,818,821

APPARATUS FOR PEELING FRUIT AND VEGETABLES

STATE OF THE PRIOR ART

U.S. Pat. No. 3,429,348 To Walter Earl Hertensteiner discloses an apparatus for pulping segmental produce by passing the segments between a moving pressurized belt and a rotating perforated drum, a section of the belt being concavely deflected to receive the segments for progressive forcing of their meats through the drum perforations, and the belt then being progressively flattened to complete the meat's separation from the segment skins which are expelled from between the drum and belt.

This operation further contemplates advancing one of the endless members, the pressurized belt or the perforated drum, at a greater surface speed, the effect of the differential being to produce a shearing effect supplementing pressurizing of the segments to progressively separate the meats from the skins.

This device provides, "particularly effective results by transversely deflecting the belt so as to present a concavity at the point of fruit segment reception, and progressively relieving the concavity to a degree approaching linear parallelism with the surface of the perforated drum, thus to create continued pressurizing of the sections down to the skin thickness."

BACKGROUND OF THE INVENTION

The present invention pertains to an apparatus for removing the meat from segmented fruits and vegetables in pulp form in direct proportion to the consistency of the meat as determined by the ripeness thereof. The present invention will be described relative to the removal of the meat from segmented avocados in pulp form, consistent with a desired degree of ripeness.

The meat of avocados, like the meat of many fruits and vegetables, ripens from the inside outwardly toward the peel. In partially ripened avocados, the innermost portion of the meat is soft and flavorable, and the consistency and flavor of the meat becomes continuously less desirable toward the outside or peel thereof. By way of contrast, a fully ripened avocado will provide meat which is soft and flavorable out to the peel. Unripened meat, if removed from the peel along with the ripe meat, detracts from the taste and quality of the end product. It is, therefore, a principal object of the present invention to provide an apparatus which will distinguish between fully and partially ripened avocados and will remove only the meat which has ripened to a desirable degree.

To accomplish this end result, the segmented avocados are fed by a conveyor means between a perforated drum and an endless belt by drum means which exert a pre-set, constant pressure on the segmented avocados which is sufficient to remove only the meat which has ripened to a desirable degree. Beyond the desirable degree of ripeness, the consistency of the meat is such that the drum means yields against the preadjusted pressure to permit the undesirable, unripened meat to remain on the peel to be discharged therewith.

It is preferable to advance the pressurized belt and the perforated drum at approximately the same surface speed. A substantial speed differential as employed in the aforementioned prior art patent will effect a shearing action resulting in the removal of hard, unflavorable, unripened meat from the peel.

BRIEF DESCRIPTION OF THE DRAWINGS

FIGS. 1a and 1b in combination present a side elevational view of the apparatus for peeling fruits and vegetables and the feed conveyor system in accordance with the present invention, the lines x—x on both views indicating the line of separation;

FIG. 2 is a vertical sectional view taken along the line 2—2 of FIG. 1a; and

FIG. 3 is a vertical sectional view taken along the line 3—3 of FIG. 1a.

DETAILED DESCRIPTION OF THE DRAWINGS

Figure 1A:
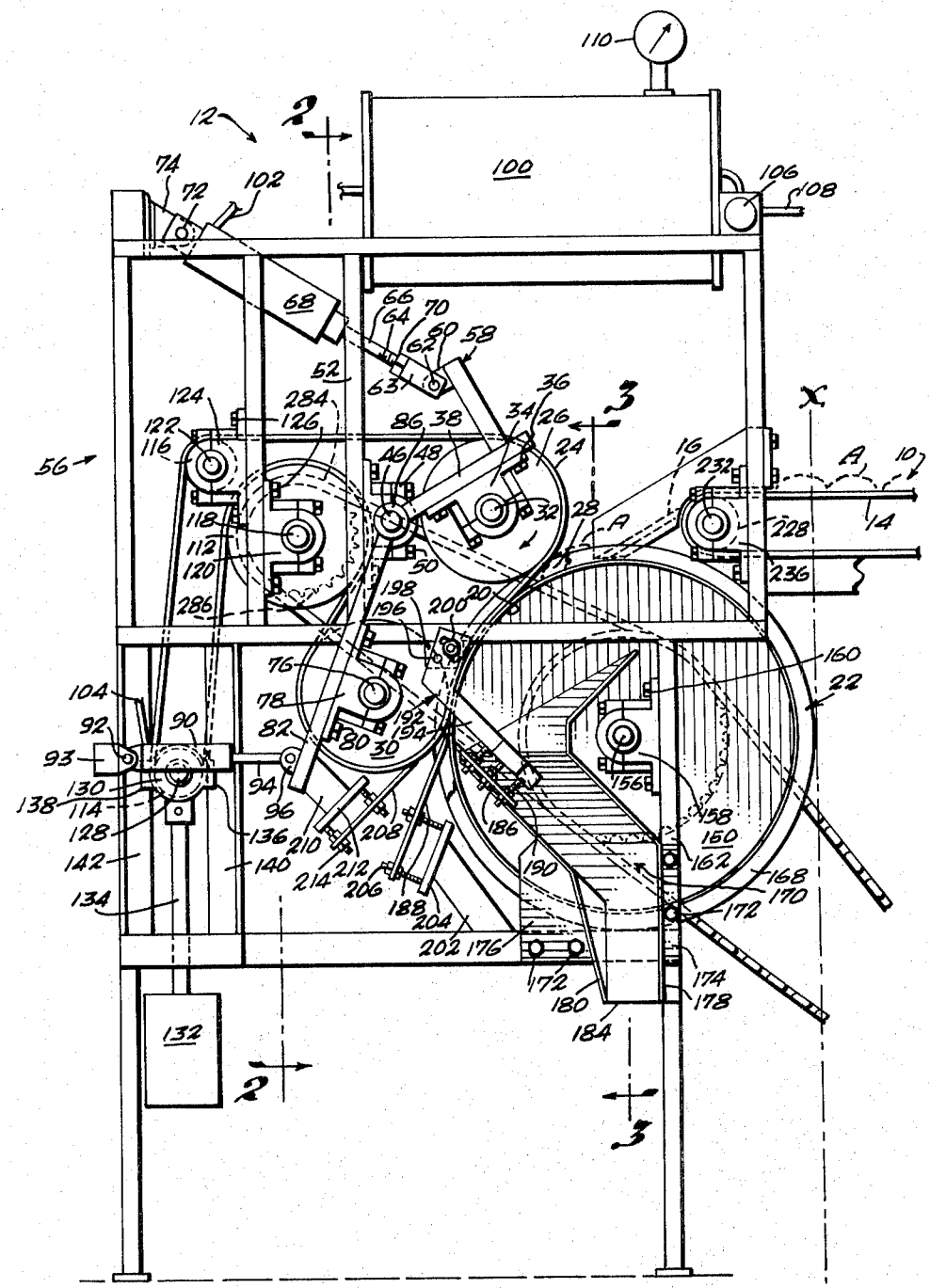

With reference to the drawings in which like reference characters designate like or corresponding parts throughout the various views, and with particular reference to FIGS. 1a and 1b, the numeral 10 indicates generally the feed conveyor structure for avocados, (FIG. 1b); the numeral 12 indicates the avocado peeling mechanism (FIG. 1a).

Referring first to the peeling mechanism of FIG. 1a, an endless belt type of conveyor 14 of the feed conveyor system 10 delivers the segmented avocados A to the peeling mechanism 12 by means of an inclined ramp 16. In practice, the avocados A are cut in half and the seed removed at a station beyond the outer end 18 of the conveyor belt 14. The avocado halves are fed as by a second conveyor belt to the belt 14 with the meat side down and retain that attitude until they move from the ramp 16 onto a perforated cylindrical wall 20 of a large drum 22. An endless belt 24 is directed into contact with the perforated wall 20 by a drum 26 which is adjustable, in a manner to be subsequently described, to provide a throat area 28 to receive the avocado halves.

From the drum 26, the belt 24 passes generally downwardly into engagement about a second drum 30 which is pressure urged against the outer face of the perforated cylindrical wall 20. Drum 26 is rotatably carried by a shaft 32, journaled at its respective ends in a pair of bearing blocks 34—34, fixed by bolts 36 to a first pair of arms 38 and 40, FIGS. 1a and 2. The arms 38 and 40 are pivoted at 42 and 44 on the respective end portions of a transverse shaft 46, journaled in a pair of bearing blocks 48—48 which are bolted at 50 to a pair of side uprights 52 and 54 of a main frame assembly 56.

The arms 38 and 40 are bridged by a generally inverted, U-shaped frame 58 providing a central ear 60 for pivotal attachment at 62 to a clevis 63 which is adjustable relative to the screw-threaded outer end 64 of the piston rod 66 of an air cylinder 68. A lock nut 70 is threaded on the screw-threaded end 64 to engage the clevis 63. As illustrated in FIG. 1a, the outer end of the air cylinder 68 is pivotally attached at 72 to an ear 74 fixed atop the rear end of the main frame 56.

With further reference to FIGS. 1a and 2, the drum 30 is rotatably carried by a shaft 76, journaled at its respective ends in a pair of bearing blocks 78—78 bolted at 80 to a second pair of arms 82 and 84, which are fixed at their respective ends 86 and 88 to the rotatable transverse shaft 46.

A pair of air cylinders 90—90 (one shown in FIG. 1a) are pivotally attached at 92 to a bar 93 fixed to the main frame 56. The outer ends of the cylinder pistons 94—94 are pivotally attached between pairs of ears 96 and 98 (FIG. 2), fixed to the lower end portions of the respective arms 82 and 84.

Fixed atop the main frame 56, a compressed air storage tank 100 is connected by conduits 102 and 104 to the rear ends of the respective air cylinders 68 and 90. An air pressure regulator means 106 is disposed in the intake conduit 108 between the compressor (not shown) and the storage tank 100 and a pressure indicator gauge 110 opens into said tank 100.

As previously described, the endless belt 24 extends around the drums 26 and 30. From the drum 30 the belt passes up and over a third drum 112, down and around a small tensioning drum 114, back up and over an idler drum 116 and the forwardly to the drum 26.

Drum 112 is carried on a shaft 118, journaled in bearing blocks 120—120 and the idler drum 116, carried on a shaft 122, is journaled in bearing blocks 124—124. Bearing blocks 120 and 124 are bolted at 126 to the main frame 56.

Referrring to the small tensioning drum 114, the transverse shaft 128 therefor is journaled in respective side, sliding bearing blocks 130—130 (only one side illustrated). From each sliding bearing block a tensioning weight 132 is suspended on the lower end of a connecting rod 134. Each sliding bearing block 130 includes pairs of oppositely-extending ears 136 and 138 for sliding engagement relative to spaced-apart, confronting webs 140 and 142 of a pair of L-irons forming a part of the main frame 56.

With reference to FIGS. 1a and 3, the large drum 22 is comprised generally of the perforated cylindrical wall 20 and an annular closure wall 150 across one end thereof, the opposed end 152 being open to the interior of the drum. Boss means 154 are fixed as by welding centrally of the end closure wall 150 for fixed engagement with a transverse shaft 156, journaled at its opposed ends in bearing blocks 158—158 bolted at 160 to side vertical members 162 and 164 of the main frame 56. A pair of annular flanges 166 and 168 are fixed by any conventional means about the opposed side edges of the perforated cylindrical wall 20.

With further reference to FIGS. 1a and 3, an outwardly and downwardly inclined discharge chute 170 is fixed to the main frame by bolts 172 extending through a pair of flanges 174 and 176, turned outwardly with respect to a pair of chute side walls 178 and 180. As best illustrated in FIG. 3, the chute 170 includes a portion 182 interiorly of the drum 22 which substantially spans the width of said interior. The outer end 184 of the discharge chute 170 is disposed so that a receptacle can be placed thereunder to receive the avocado pulp, deposited in the chute, in a manner to be subsequently described.

Two doctor blades 186 and 188 are associated with the large drum 22. Doctor blade 186 extends transversely across the interior of the large drum 22 and includes an edge which is normally positioned in close proximity to the inner surface of the perforated wall 20 to dislodge the avocado pulp therefrom and to direct it into the discharge chute. A plurality of adjustment screws and associated lock nuts 190 extend outwardly and downwardly from an arm assembly 192, positioned outwardly of the open side 152 of the large drum 22 to properly position the edge of the doctor blade 186 relative to the inner surface of the annular perforated wall 20. An arm 194 of the assembly 192 is pivoted at 196 to an ear 198 fixed to the main frame 56, and an arcuate slot and lock nut, indicated generally at 200, provide a further adjustment means for the doctor blade 186.

The second doctor blade 188 extends transversely across the outside of the annular perforated wall 20 and includes an edge, normally positioned in close proximity thereto. Doctor blade 188 is carried by a pair of arms 202, fixed to the main frame 56, which connect with a transverse plate 204 providing adjustment screw and lock nut means 206 for positioning purposes.

A third doctor blade 208 is carried by a pair of arms 210 fixed to the lower distal end portions of the respective arms 82 and 84, which connect with a transverse plate 212 providing adjustment screw and lock nut means 214 for positioning purposes.

The feed conveyor structure 10 is comprised generally of a main frame assembly 220 which supports the endless feed belt 14. As illustrated in FIG. 1b, the top run 221 of the feed belt 14 traverses a flat, horizontal surface 222 of a housing 224 and extends between forward and rear drums 226 and 228, carried by respective shafts 230 and 232, journaled in pairs of bearing blocks 234 and 236, fixed to the respective main frame assemblies 220 and 56.

From the drum 228, the endless feed belt 14 passes forwardly around an idler drum 238, provided with adjustable tensioning means, indicated generally at 240. The belt 14 is then turned rearwardly, passing around a drive drum 242. From the drive drum 242, the belt passes forwardly around a small diameter idler drum 244 and is directed into a bath tank 246 by a similar small diameter idler drum 248, rotatably journaled within said tank 246 at 250. From the drum 248, the belt 14 passes upwardly about an idler drum 252 to the top forward drum 226.

Intermediate the idlers 248 and 252, a transverse rotary scrub brush 254 is journaled at 256 to the main frame 220 in scrubbing contact with the surface 258 of the belt 14. Appropriate forward and rear drain pans 260, 261 and 262 are fixed to the main frame 220 to direct all drainage back to the bath tank 246.

A pair of cold water inlets to the bath tank 246 are provided at 264 and 266, a hot water inlet at 268, an overflow at 270, and a drain at 272.

Power is supplied by a conventional motor and speed reducer assembly 274. Sprocket means 276 provide a power take-off by means of a chain 278 to the drive drum 242 for the feed conveyor 14 and to the large drum 22 by means of the chain 280 to the sprocket means 282, fixed to the shaft 156. A chain 284 from the sprocket means 282 engages around a sprocket 286 to drive the drum 112, engaging the endless belt 24. The rotary scrub brush 254 is chain driven at 288 from the drive drum 242.

In operation, the avocados are precut into halves, the seeds are removed, and the halves are placed or fed onto the conveyor belt 14 with the meat side down. From the conveyor belt 14, the avocado halves A are fed down the inclined ramp 16 into the throat area 28, defined by the converging belt 24 and the perforated annular wall 20 of the large drum 22. The outer, contact surface of the endless belt 24 is preferably textured to provide a means to grip the avocado havles A as they are moved into contact with the two surfaces in the throat area 28. Because the surfaces of the drum 26 and the perforated annular wall 20 are transversely parallel, the center, thickest portion of each avocado half A, will be compressed first, causing the ripe meat of that portion to be passed through the perforations in the annular wall 20 in pulp form. The pre-set air pressure supplied to the rear end of the air cylinder 68, 20 psi, for example, permits the drum and belt 26 and 24 to yield in the event any hard, unripened meat is encountered between the belt 24 and the perforated wall 20.

As each avocado half A passes downwardly between the belt 24 and the perforated annular wall 20, it is gradually flattened with the ripe meat being passed through the perforations in pulp form. In the final stage of ripe meat removal, the peel is completely flattened between the belt 24, where it begins contact with the drum 30, and the perforated wall 20. Because the drum 30 is urged toward the large drum 22 by the pre-set air pressure, supplied to the rear ends of the pair of air cylinders 90—90, only the ripe meat will be removed over the entire inner surface of the peel.

The flattened peel with the hard unripened meat, if any, remaining thereon will be discharged between the doctor blades 188 and 208 into a suitable receptacle or onto a waste discharge conveyor. The doctor blades 188 and 208 serve to dislodge any peel residue adhering to the annular perforated wall 20 and the outside surface of the endless belt 24. Interiorly of the large drum 22, the doctor blade 186 dislodges the avocado pulp from the interior surface of the annular perforated wall 20, directing it into the discharge chute 170 for passage into a suitable receptacle placed under the lower end 184 thereof.

While other adjustable pressure applying means, such as compression springs, may be substituted for the air cylinder and piston devices, said air cylinder and piston devices are preferable because the pressure forces can be more accurately controlled and the pressure therein remains constant regardless of the extent of piston movement.

It will be apparent to anyone skilled in the art that various structural changes and arrangement of elements can be made without departing from the true spirit of the invention as defined in the appended claims.

What is claimed is:

1. An apparatus for removing the meat, in pulp form, from the peels of various segmented fruits and vegetables comprising,
   A. a moving endless belt;
   B. a large drum including a perforated cylindrical wall moving in the same direction as said endless belt;
   C. means directing said moving belt, in a first stage, into close proximity to the outer surface of said perforated cylindrical wall and in a second stage, normally into contact with said perforated cylindrical wall, said directing means maintaining said moving belt in a normal transversely parallel relation to said cylindrical, perforated wall;
   D. means for feeding the segments between said moving belt and said perforated cylindrical wall with the meat on the segments in engagement with said perforated cylindrical wall;
   E. adjustable pressurizing means, connecting with said directing means, preset so that the soft ripe meats on the segments are forced through said perforations and the peels, including the harder unripe meat, if any, adhering thereto, are advanced and discharged from between said belt and large drum.

2. The apparatus as defined in claim 1 wherein said directing means includes a first drum, directing said moving belt through said first stage and a second drum, spaced from said first drum, directing said moving belt through said second stage.

3. The apparatus as defined in claim 2 wherein the surfaces of said first and second drums are transversely parallel to the surface of said perforated cylindrical wall.

4. The apparatus as defined in claim 1 wherein said moving endless belt is passed around a series of drums including a tensioning drum, journaled in sliding bearings, provided with counterweight means, suspended therefrom.

5. The apparatus as defined in claim 2 wherein said dirst drum is journaled relative to first independently pivoted arm means and said second drum is journaled relative to second independently pivoted arm means.

6. The apparatus as defined in claim 5 wherein said adjustable pressurizing means comprises individual adjustable pressurizing means connecting to said first and second pivoted arm means to individually control said first and second drums.

7. The apparatus as defined in claim 6 wherein said individual pressurizing means comprises air cylinder and piston assemblies, supplied with pressurized air from a storage tank, connected with an air compressor, controlled by an air pressure regulator.

8. The apparatus as defined in claim 1 including an inclined discharge chute extending through an open side of said large drum into an interior chamber, formed therein, to collect the pulp, forced through said perforations, and to discharge same into a suitable receptacle, placed relative to said discharge chute exteriorly of said large drum.

9. The apparatus as defined in claim 8 including a first doctor blade, adjustably fixed relative to the interior surface of said perforated annular wall to dislodge the pulp therefrom and to direct same into said discharge chute.

10. The apparatus as defined in claim 9 including a second doctor blade, fixed relative to the exterior surface of said perforated annular wall and a third doctor blade, fixed relative to the exterior surface of said moving endless belt, said second and third doctor blades being positioned adjacent to the point of discharge of the peels to dislodge any peels or fragments thereof from said outer surfaces.

11. The apparatus as defined in claim 1 wherein said means for feeding comprises a conveyor belt and a ramp means, inclined downwardly from said conveyor belt to said perforated cylindrical wall.

* * * * *